R. WHITE.
Revolver.
No. 1,928. Reissued Apr. 4, 1865.
Fig. 1
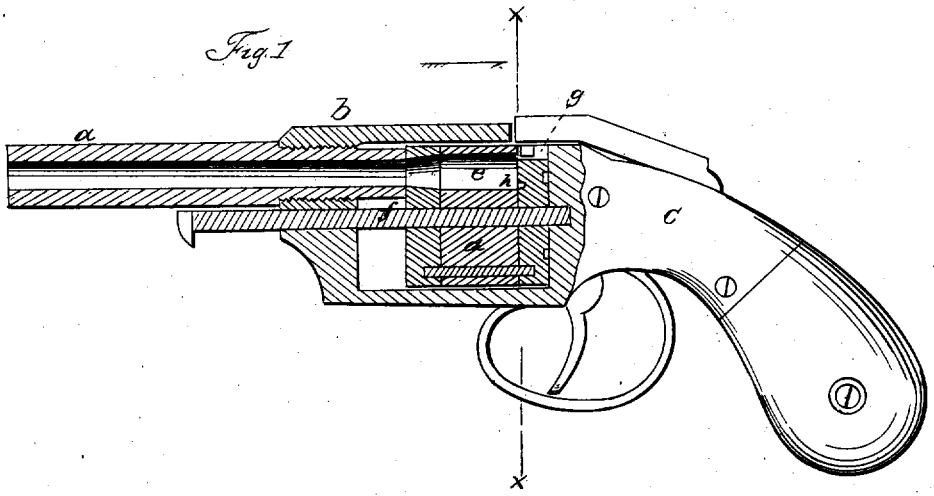
Fig 6
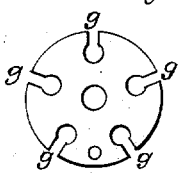
Fig 3
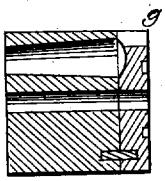
Fig 4
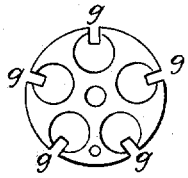
Fig 5
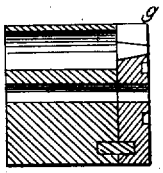
Fig 2. x. x
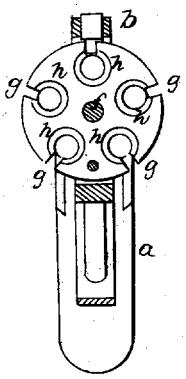
Witnesses.
A. DeLacy
J. G. Keagle
Inventor.
Rollin White
N. PETERS, PHOTO-LITHOGRAPHER, WASHINGTON, D. C.

UNITED STATES PATENT OFFICE.

ROLLIN WHITE, OF SPRINGFIELD, MASSACHUSETTS.

IMPROVEMENT IN REVOLVING FIRE-ARMS.

Specification forming part of Letters Patent No. 19,961, dated April 13, 1858; Reissue No. 1,928, dated April 4, 1865.

*To all whom it may concern:*

Be it known that I, ROLLIN WHITE, formerly of Hartford, in the State of Connecticut, but now of Springfield, in the State of Massachusetts, have invented a new and useful Improvement in Repeating Fire-Arms; and I do hereby declare that the following is a full, clear, and exact description thereof, reference being had to the accompanying drawings, making part of this specification, in which—

Figure 1 is a longitudinal section of a pistol on my improved plan; Fig. 2, a cross-section thereof, taken at the line *x x* of Fig. 1; Figs. 3 and 4, like representations of a modified mode of application, and Figs. 5 and 6 like views of another modification.

My said invention relates to an improvement in that class of repeating fire arms in which the charges are inserted in a series of parallel chambers formed about a common center in a cylinder placed behind a fixed barrel and rotated to bring the several chambers in succession in line with the fixed barrel to be fired; and the object of my said invention is so to construct the rear end or breech of the said chambered cylinder as to admit of using in the said chambers and firing therefrom cased cartridges which contain in their rear ends the fulminate priming; and my invention consists in forming the breech with a recess or aperture, so that the hammer, in striking, may enter such recess to strike against a portion of the rear end of the cased cartridge which contains the fulminate priming to fire the charge, while at the same time the breech gives support to the greater portion of the rear end of the cartridge at the time of the discharge.

In the accompanying drawings, *a* represents the fixed barrel, secured in the usual or any appropriate manner to the metallic frame *b*, which contains the chambered cylinder, the said frame being in turn secured to or making part of the stock *c*. The cylinder *d*, with its series of parallel chambers *e*, is mounted and turns on a central pin, *f*, within the frame *b* in the usual or any appropriate manner.

The rear end or breech of the cylinder may be part of the same block of metal with the part in which the chambers are formed; or it may be a separate block of metal, and may be connected therewith by a dowel-pin or other suitable means to turn with the chambered portion of the cylinder, which is to be turned by any of the known means used in turning the chambered cylinder of repeating fire-arms.

A series of recesses, *g*, are formed extending through the breech to the chambers, one such recess for each chamber, and the hammer is formed to enter any one of such recesses when either chamber is in line with the barrel, and the rear end of the chambers may be variously formed to receive and to facilitate the firing of the fulminate priming of the cased cartridges. Three forms are represented as examples: In Figs. 1 and 2 the rear end of the bore of the chamber is in the form of an annular recess, *h*, leaving a concentric cylindrical projection from the breech. In such case the fulminate should be contained in a cylindrical flange at the rear end of the cartridge, which flange will enter the annular recess at the rear end of the chamber, and fitting over the cylindrical plug projecting from the breech, the periphery of which plug will form a rest for the flange of the cartridge which carries the fulminate priming when it is struck by the hammer. In this form it will be seen that the recess *g* in the breech extends through to the annular recess *h* at the rear end of the chamber; that the hammer in making its usual sweep, common to this class of arms, may strike into the recess *g* and effectively strike the annular flange of the cartridge to insure the firing of the fulminate priming; or it may be in the form represented in Figs. 3 and 4, where the rear end of the chamber is a segment of a hollow sphere with the recess *g* in the breech extending through to the inside thereof. In this form the rear end of the cartridge should be convex, in the form of a segment of a sphere, to contain the fulminate, this arched form presenting the required resistance to enable the blow of the hammer to fire the fulminate priming; or it may be in the form represented in Figs. 5 and 6—that is, a small central recess or hole in the breech to receive a central nipple containing the fulminate priming at the rear end of the cartridge, the recesses *g* for the hammer extending through, that the hammer in its usual swing may strike such nipple.

I am aware that a fire-arm has been described which consists of a fixed barrel and a movable chamber between the barrel and the fixed breech, in which breech there is an aperture or recess through which the hammer of the lock is permitted to strike directly against the rear end of the cartridge containing the fulminate priming, and therefore I do not wish to be understood as claiming such arrangement; but in the said arm there is no cylinder with a series of parallel chambers to be brought each in succession in line with the fixed barrel and the hammer of the lock; and I am also aware that prior to my said invention it has been proposed to construct a fire-arm consisting of a fixed barrel, a rotating cylinder having a series of parallel chambers, which are in succession brought in line with the fixed barrel to be fired, and a small aperture for each chamber made through the rear end of the cylinder, and a single aperture through the recoil-shield behind the cylinder for the passage of a fine needle operated by the lock to puncture the rear end of the cartridges, and thereby fire the charge, on the principle of what is known as the "Prussian needle-gun," and therefore I do not wish to be understood as making claim to any such arrangement; but in such arm no provision is made for the hammer to strike directly against the rear end of a metallic-cased cartridge provided with percussion-priming, nor is there any surface either in the cartridges to be used or in the arm itself to resist the blow of the hammer and act as an anvil to explode the fulminate.

What I claim as my invention, and desire to secure by Letters Patent in that class of arms consisting of a fixed barrel with a rotating cylinder having a series of parallel chambers which are brought in succession in line with the barrel to be fired, is—

Making a recess or aperture through the breech and communicating with but of less area than the rear end of the chamber, and of a form, substantially as described, suited to and in combination with the hammer or the equivalent thereof to strike through such recess against the rear end of the cased cartridge which contains the fulminate priming, as set forth.

ROLLIN WHITE.

Witnesses:
A. DE LACY,
ANDREW I. TODD.